United States Patent
Hecht et al.

(10) Patent No.: US 9,449,255 B2
(45) Date of Patent: Sep. 20, 2016

(54) METHOD AND APPARATUS FOR THE DETERMINATION OF CLASSIFICATION PARAMETERS FOR THE CLASSIFICATION OF BANK NOTES

(71) Applicant: GIESECKE & DEVRIENT GMBH, Munich (DE)

(72) Inventors: Matthias Hecht, Neubiberg (DE); Stefan Kokrhoun, Grobenzell (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 37 days.

(21) Appl. No.: 14/364,167

(22) PCT Filed: Dec. 18, 2012

(86) PCT No.: PCT/EP2012/005239
§ 371 (c)(1),
(2) Date: Jun. 10, 2014

(87) PCT Pub. No.: WO2013/091841
PCT Pub. Date: Jun. 27, 2013

(65) Prior Publication Data
US 2014/0348413 A1  Nov. 27, 2014

(30) Foreign Application Priority Data

Dec. 21, 2011  (DE) .................. 10 2011 121 877

(51) Int. Cl.
*G06K 9/62*  (2006.01)
*G07D 11/00*  (2006.01)
(Continued)

(52) U.S. Cl.
CPC ........... *G06K 9/6215* (2013.01); *G06K 9/6271* (2013.01); *G07D 7/00* (2013.01); *G07D 7/08* (2013.01); *G07D 7/12* (2013.01); *G07D 11/0084* (2013.01)

(58) Field of Classification Search
CPC ............. G06K 9/6215; G06K 9/6267; G06K 9/6271; G06K 9/6284; G07D 7/00; G07D 7/08; G07D 7/12; G07D 11/0084
See application file for complete search history.

(56) References Cited

U.S. PATENT DOCUMENTS 5,335,484 A * 8/1994 Hain .................. G07D 11/0003
156/541
5,636,565 A * 6/1997 Lawrance ................. B31F 1/07
101/32
(Continued)

FOREIGN PATENT DOCUMENTS

DE         10314071 B3     9/2004
DE      102004024620 A1   12/2005
(Continued)

OTHER PUBLICATIONS

International Search Report from corresponding International PCT Application No. PCT/EP2012/005239, May 7, 2013.
(Continued)

*Primary Examiner* — Katrina Fujita
(74) *Attorney, Agent, or Firm* — Workman Nydegger

(57) ABSTRACT

A method for the determination of classification parameters or adaptation parameters for the classification of bank notes in different classes by means of a bank note processing apparatus includes: sensing measurement data for a plurality of reference bank notes having known properties by means of a sensor device of the bank note processing apparatus, at least some of the reference bank notes being provided with an adhesive strip; determining a set of classification parameters; ascertaining the distribution of the plurality of reference bank notes over the different classes on the basis of the measurement data of the reference bank notes and the set of classification parameters; and comparing the distribution over the different classes determined for the plurality of reference bank notes, with the optimal distribution of the reference bank notes over the different classes, and ascertained from the known properties of the plurality of reference bank notes.

9 Claims, 3 Drawing Sheets

(51) Int. Cl.
  *G07D 7/00* (2016.01)
  *G07D 7/12* (2016.01)
  *G07D 7/08* (2006.01)

(56) References Cited

U.S. PATENT DOCUMENTS

| | | | |
|---|---|---|---|
| 5,992,600 | A * | 11/1999 | Baudat ................ G06K 9/6267 194/207 |
| 7,028,888 | B2 * | 4/2006 | Laskowski ......... G06Q 20/1085 235/379 |
| 7,433,844 | B2 * | 10/2008 | Laskowski ......... G06Q 20/1085 235/379 |
| 7,447,353 | B2 | 11/2008 | Diederichs et al. |
| 7,623,244 | B2 | 11/2009 | Stein et al. |
| 8,245,831 | B2 | 8/2012 | Holl et al. |
| 8,408,398 | B2 * | 4/2013 | Yui .......................... G07D 7/00 194/206 |
| 8,588,477 | B2 | 11/2013 | Holl et al. |
| 2006/0251320 | A1 | 11/2006 | Diederichs et al. |
| 2008/0123081 | A1 | 5/2008 | Stein et al. |
| 2008/0283451 | A1 | 11/2008 | Holl et al. |
| 2009/0245590 | A1 | 10/2009 | Holl et al. |
| 2009/0312957 | A1 * | 12/2009 | Domke .............. G01N 29/0618 702/39 |
| 2010/0128934 | A1 | 5/2010 | Su et al. |

FOREIGN PATENT DOCUMENTS

| | | |
|---|---|---|
| DE | 102006053788 A1 | 5/2008 |
| DE | 102007019107 A1 | 10/2008 |
| WO | 2006018283 A2 | 2/2006 |

OTHER PUBLICATIONS

International Preliminary Report on Patentability for International PCT Application No. PCT/EP2012/005239, Jun. 24, 2014.

* cited by examiner

METHOD AND APPARATUS FOR THE DETERMINATION OF CLASSIFICATION PARAMETERS FOR THE CLASSIFICATION OF BANK NOTES

BACKGROUND

The invention relates to a method for the determination of classification parameters or adaptation parameters for the classification of bank notes, in which properties of a bank note to be classified are ascertained and one class of several possible classes is determined by means of the classification parameters on the basis of the ascertained properties of the bank note. The invention further relates to an apparatus for carrying out the method, to a computer program for carrying out the method, as well as to a data carrier having the computer program.

Although the present invention is in principle employable without restriction for all types of sheet-like value documents, the present invention focuses particularly on bank notes, so that in the following instead of the general term "value documents" normally the term "bank notes" is employed for simplicity's sake, without this being understood as restrictive.

Classification methods are used in particular upon the detection and subsequent sorting of bank notes in bank note processing apparatuses. Here, at first physical quantities of the bank note to be classified are measured and a plurality of properties of the bank note is derived therefrom. Using the derived properties and with the aid of classification or adaptation parameters there is then ascertained a class, i.e. selected from several possible classes, and the bank note is assigned to this class. In a subsequent sorting process, the bank note can then be output in an output pocket provided for the corresponding class.

In such bank note processing apparatuses there is often taken a digital image of a bank note or of a region thereof by means of a suitable imaging sensor unit, for example a CCD or CMOS sensor. Such a digital bank note image consists of individual image points (pixels) with associated pixel values or intensity values, the pixels of colored images normally having assigned three pixel values. This bank note image is supplied in electronic form to a control and evaluation device of the bank note processing apparatus and can be employed by this, in addition to other measured properties of the bank note, for the classification of the bank note. For this purpose, on the basis of the digital image of the bank note or a part thereof and by means of the control and evaluation device of the bank note processing apparatus an optical or physical property of the bank note is quantitatively determined, for example an averaged intensity value in a certain region of the bank note image, and compared with an associated parameter, e.g. a threshold value, of a specified set of classification parameters.

Although digital bank note images are well suited for the determination of a plurality of properties of bank notes, e.g. the determination of the denomination of a bank note, certain properties can be determined in an only very restricted manner by means of a digital image of a bank note. For example for detecting adhesive strips on a bank note there is therefore normally employed a thickness sensor in the form of an ultrasonic sensor. The detecting and, where applicable, sorting out of bank notes provided with adhesive strips is desirable, since bank notes provided with adhesive strips can easily lead to jams in cash dispensing machines.

But before a bank note processing apparatus can be employed for processing bank notes, i.e. in particular for classifying, counting and sorting bank notes, a set of classification parameters must be created for the bank notes to be processed and be deposited for example in the control and evaluation device of the bank note processing apparatus. This procedure is known to the person skilled in the art also as an adaptation of a bank note processing apparatus. Ultimately, the trick with the adaptation is to chose the classification or adaptation parameters such that for as much bank notes as possible the class determined by the control and evaluation unit is equal to the "actual" class of a bank note. In other words: the classification or adaptation parameters determine the distribution of the bank notes over the classes defined by the classification parameters.

SUMMARY

In practice it has turned out that in particular the adaptation of an ultrasonic sensor of a bank note processing apparatus to the detection of bank notes having adhesive strips is often very elaborate, so that this must normally be performed manually by an expert. Because of the size and multidimensionality of the parameter space defined by the classification parameters this expert must use his specialist knowledge and his wealth of knowledge here, in order to recognize which influence the change of one or several classification parameters has on the distribution of the bank notes over the different classes.

Against this background it is the object of the present invention to provide an improved method as well as a corresponding apparatus for the determination of classification parameters for the classification of bank notes, in particular in a bank note processing apparatus having a sensor unit for detecting bank notes having adhesive strips.

The method according to the invention for the determination of a set of classification parameters or adaptation parameters for the classification of bank notes into different classes by means of a bank note processing apparatus comprises the following steps. Sensing measurement data for a plurality of reference bank notes having known properties by means of a sensor device of the bank note processing apparatus, at least some of the reference bank notes being provided with an adhesive strip. Determining a set of classification parameters. Ascertaining the distribution of the plurality of reference bank notes over the different classes on the basis of the measurement data of the reference bank notes and the set of classification parameters. Comparing the distribution over the different classes, which was determined for the plurality of reference bank notes, with the optimal distribution of the reference bank notes over the different classes, which was ascertained from the known properties of the plurality of reference bank notes. If the two distributions deviate from each other, adjusting the set of classification parameters until the distribution of the plurality of reference bank notes over the different classes, which was determined on the basis of the measurement data of the reference bank notes and the changed set of classification parameters, and the optimal distribution of the reference bank notes over the different classes, which was ascertained from the known properties of the plurality of reference bank notes, no longer deviate from each other or the deviation between these distributions is acceptable.

According to a preferred embodiment, for the determination of the deviation between the distribution of the plurality of reference bank notes over the different classes, which was determined on the basis of the measurement data of the reference bank notes and the set of classification parameters, and the optimal distribution of the reference bank notes over the different classes, which was ascertained from the known properties of the plurality of reference bank notes, there is employed a distance measure which must be minimized.

Preferably, the measurement data sensed for a plurality of reference bank notes by the sensor device of the bank note processing apparatus contain both optical measurement data, in particular image data, of the reference bank notes, which were sensed by means of an optical sensor unit of the sensor device, and measurement data sensed by means of an ultrasonic sensor unit of the sensor device.

According to a preferred embodiment of the invention, the reference bank notes provided with an adhesive strip are configured such that these reference bank notes contain additional information items for the determination of a classification parameter relating to the measurement data of the ultrasonic sensor unit, which information items can be ascertained by means of the optical sensor unit and can be employed for the determination of the classification parameter relating to the measurement data of the ultrasonic sensor unit.

In the reference bank notes having an adhesive strip the adhesive strips are preferably configured colored, namely preferably with a color which stands out against the one or more colors which the background of the reference bank note has in the surrounding of the colored adhesive strip, so that for example a respective adhesive strip area can be readily determined by means of the measurement data captured by the optical sensor unit.

Alternatively, it is conceivable that the adhesive strips on the reference bank notes are configured colored, the adhesive strips occupying different areas on the reference bank notes and having different colors, so that between the area and the color of an adhesive strip there exists a unique assignment which is employed for deriving the area of an adhesive strip due to its color.

According to a further preferred embodiment, the reference bank notes with an adhesive strip have the additional information items for the determination of a classification parameter relating to the measurement data of the ultrasonic sensor unit, which information items can be ascertained by means of the optical sensor unit and can be employed for the determination of the classification parameter relating to the measurement data of the ultrasonic sensor unit, in the form of a numeric string, a denomination, a graphical motif, a barcode, or the like.

Preferably, the additional information items for the determination of a classification parameter relating to the measurement data of the ultrasonic sensor unit, which are deposited on the reference bank notes such that these can be ascertained by means of the optical sensor unit and can be employed for the determination of the classification parameter relating to the measurement data of the ultrasonic sensor unit, contain, instead of the area information-items or additional to these, further information items about an adhesive strip, such as for example the position, thickness, extension and/or form of an adhesive strip on a reference bank note.

The classification parameters determined according to the above-described method can be advantageously used in a method for classifying bank notes, which comprises the following further steps: determining at least one quantitative property of a bank note to be classified; and classifying the bank note to be classified on the basis of the quantitative property of the bank note to be classified and the classification parameters.

The possible classes, from which one is to be chosen, are for example the denominations of the various bank notes. Possible classes can then be provided for example for 5, 10, 20, 50, 100, 200 and 500 Euro notes.

In general, the ascertainment of a class can also be effected, however, additionally with respect to the authenticity and/or fitness, i.e. the capability of the bank note for a reuse, whereby this classification may also be dependent on whether or not a bank note has an adhesive strip. The individual possible classes then additionally reflect for example different degrees of authenticity or fitness of the value documents to be classified, such as for example "authentic", "fit for use", "to be destroyed" and the like.

The method according to the invention can be carried out completely or at least partly automatically in particular by means of a corresponding apparatus for the classification of bank notes. In the apparatus according to the invention, a control and evaluation device can in principle be designed as an arbitrary analogue, mixed analogue-digital or purely digital circuit. It is also possible that this comprises solely a so-called "field programmable gate array" (FPGA), which has the advantage that corresponding modules can be adjusted for the method to be carried out solely by pre-programming, but upon carrying out work like a digital circuit. In this way, with small-scale series the production costs can be kept low. Preferably, however, the control and evaluation device has at least one processor and one memory in which a computer program according to the invention, which is executable with the processor, for carrying out the method according to the invention is stored. The employment of a programmable control and evaluation device has the advantage that the apparatus can be easily adjusted to new types of bank notes.

A "processor" within the context of the invention is understood to be any processor, for example a microcontroller or a multi-purpose processor or a digital signal processor or a combination with a multi-purpose processor and/or a signal processor and/or a microcontroller and/or an FPGA.

The object is thus further achieved by a computer program for carrying out the method according to the invention. Such a computer program can be stored in particular in the memory of the control and evaluation device.

A further subject matter of the invention is a data carrier, on which a computer program according to the invention is stored. As data carriers there come into consideration in particular optical data carriers, such as for example CDs or DVDs, magneto-optical data carriers, magnetic data carriers, such as for example hard disks and semiconductor memories, for example EEPROMs or flash memories, whose contents can be accessed by a corresponding device of a computer.

In order for a user to be able to have displayed the results of an adaptation and, where applicable, to intervene in the adaptation process, the control and evaluation device is connected, in accordance with a preferred embodiment, with an external computer having a display unit. On the external computer there can be implemented a graphical user interface which servers in a known manner for the interaction with the user. The external computer can further be connected with an external database for storing data, in particular measurement data. In other embodiments, the external computer and/or the external database can be integrated in the control and evaluation device.

BRIEF DESCRIPTION OF THE DRAWINGS

Further features, advantages and objects of the invention are indicated by the following detailed description of several exemplary embodiments and alternative embodiments. Reference is made to the drawings, in which shows.

DETAILED DESCRIPTION OF VARIOUS EMBODIMENTS

Figure 1:
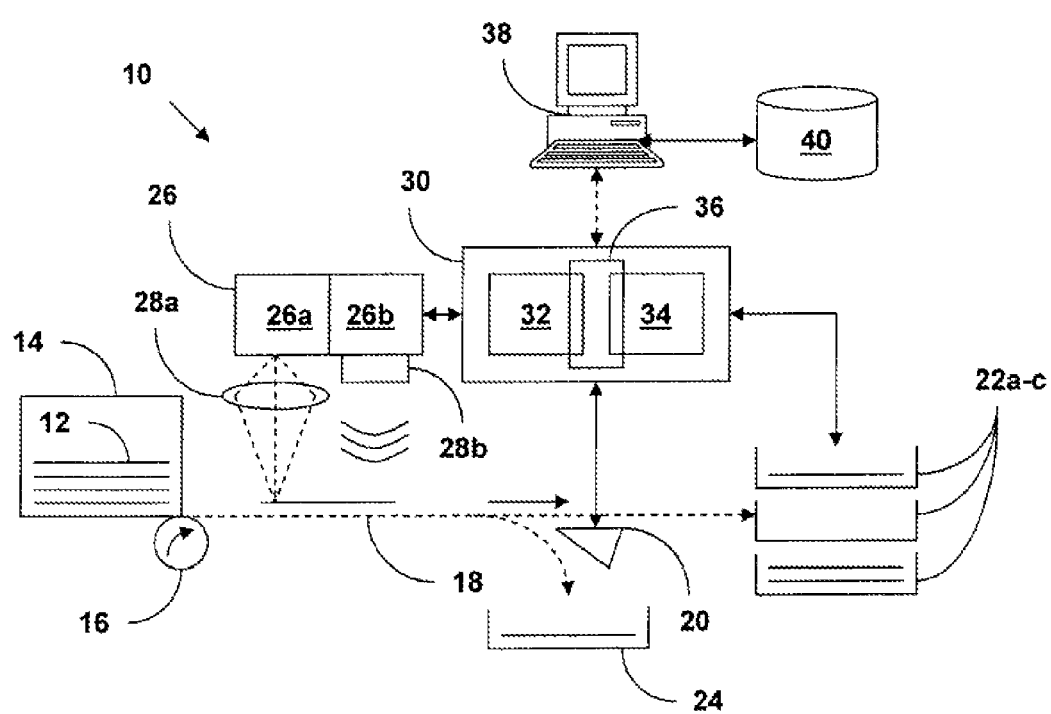
FIG. 1 a schematic representation of a bank note processing apparatus.

FIG. 1 shows an apparatus 10 for the determination of a set of classification or adaptation parameters and for the classification and corresponding processing of bank notes, a bank note processing apparatus 10 for short. The apparatus 10 has an input pocket 14 for the input of bank notes 12 to be classified in the form of a stack and a singling device 16 known to the person skilled in the art, which can access the bank notes 12 in the input pocket 14 and feed these to a transport system 18 having a gate device 20. Downstream of the gate device 20 along a first branch of the transport system 18 there are located several output pockets 22a-c, which in turn respectively have connected upstream a gate device (not represented), in order to guide a bank note 12 into one of the output pockets 22a-c. The apparatus 10 finally has, along a second branch of the transport system 18, a reject pocket 24 for sorted-out bank notes. Of course, a bank note processing apparatus according to the invention can also have, instead of the three output pockets 22a-c represented in FIG. 1, more or less output pockets, for example respectively one output pocket for the denominations occurring in a currency.

Along a transport path defined by the transport system 18 a bank note 12 to be classified runs, after the singling device 16 and before the gate device 20, through the field of view of a sensor unit 26, which serves for capturing physical properties of bank notes 12 fed in singled form and for forming corresponding sensor signals or measurement data.

A control and evaluation device 30 is connected in particular with the sensor unit 26, the gate device 20 and the gate devices connected upstream of the output pockets 22a-c via data and/or signal connections, as this is indicated in FIG. 1 by double arrows, and serves for evaluating the sensor signals or measurement data of the sensor device 26 and for driving for example the gate device 20 and the gate devices connected upstream of the output pockets in dependence on the results of the evaluation of the sensor signals. The sensor device 26 comprises preferably an optical sensor unit 26a for capturing optical properties as well as a sensor unit 26b for determining the local thickness of a bank note, preferably an ultrasonic sensor unit 26b, which is suitable in particular for detecting bank note defects, such as for example adhesive strips, tears, dog's ears and the like.

The optical sensor unit 26a comprises at least one imaging optical sensor, which serves in combination with an optical device 28a known to the person skilled in the art, for example a lens arrangement, for capturing optical properties of bank notes 12 fed in singled form and for forming corresponding sensor signals or measurement data. Preferably, the optical sensor unit 26a is configured to create a digital image of at least one section of a bank note 12, preferably of the whole bank note 12, by means of optical radiation which is remitted by the bank note 12 (remission) and/or passes through this (transmission). For this purpose, the apparatus 10 further has at least one light source (not represented) that is suitably configured and suitably arranged relative to the bank note 12 and to the optical sensor unit 26a. Preferably, the imaging optical sensor is a CCD or CMOS sensor, which preferably creates a digital image of the entire bank note 12, which image consists of individual pixels or image points with associated pixel values or intensity values. As this is known to the person skilled in the art, in the case of a colored image of a bank note 12 each pixel normally has more than one pixel value or color coordinate value.

For the creation of a digital image of a bank note 12 upon the transport of the bank note 12 through the field of view of the optical sensor unit 26a of the sensor device 26, the optical sensor unit 26a can be configured such that an image is captured simultaneously for the entire bank note 12. It is also possible, however, that a sensor line of the optical sensor unit 26a captures line by line image data of a bank note 12 moved past the sensor line and the image data thus captured are assembled into a digital image of the bank note 12. The image data for a pixel comprise the pixel value or in the case of colored images the pixel values or color coordinate values (for example in the CIE XYZ color space) as well as the place or the location of the pixel on the bank note. A suitable color capturing device, which can be employed as an optical sensor unit 26a in the bank note processing apparatus 10 according to the invention, is described for example in the international patent application WO 2006/018283.

In the case of colored images, pixel values or color coordinate values can be generated in an arbitrary manner. For example, digital images of bank notes can be captured simultaneously or one after the other in several spectral regions specified preferably in dependence on the employed color space. The color coordinate values can here be obtained either directly by employing suitable sensor or detection units or after the transformation of other captured image data. It is in principle possible to employ arbitrary color spaces. Preferably, however, color spaces with three dimensions are employed, but it is also possible to employ even higher-dimensional color spaces. As a color space there can further also be employed a color space that is specific for the optical sensor unit 26a employed for the imaging. In particular, there can be employed for example the RGB or the HSI color space as a color space. Preferably, a color space defined independently of a device is employed as a color space. In particular, for example a standardized color space, such as the CIE XYZ color space can be employed as a color space.

As already mentioned above, the sensor device 26 comprises, in addition to the optical sensor unit 26a, a sensor unit 26b for the determination of the local thickness of a bank note as a function of the position along the bank note, which is preferably configured as an ultrasonic sensor unit 26b and is in particular suitable for detecting bank notes having adhesive strips. As this is schematically represented in FIG. 1, the ultrasonic sensor unit 26b preferably comprises a device 28b for generating an ultrasonic pulse, by means of which the local thickness of a bank note can be determined as a function of the position along the bank note. For this purpose, the ultrasonic sensor unit 26b further has of course a corresponding unit, which detects the ultrasonic pulse transmitted through and/or reflected by the bank note and generates a corresponding signal. Here it is possible, as in the case of the optical sensor unit 26a, that a sensor line of the ultrasonic sensor unit 26b captures line by line measurement data of a bank note 12 moved past the sensor line and the measurement data thus captured are assembled into an "ultrasonic image" of the bank note 12.

Of course, the apparatus 10 can have, in addition to the optical sensor unit 26a and the ultrasonic sensor unit 26b, still further sensor units, such as for example optical sensors which work in other wavelength ranges (e.g. infrared), sensors for the determination of magnetic and/or other physical properties and the like, which can be part of the sensor device 26 or can respectively be formed as a separate component.

From the sensor signals or measurement data of the optical sensor unit 26a and the ultrasonic sensor unit 26b of the sensor device 26 and, where applicable, further sensor units of the sensor device 26 there is ascertained at least one quantitative bank note property by the control and evaluation device 30. Preferably, several of these properties are ascertained and, where applicable, suitably linked with each other, for example by means of linear combinations of properties. Further, by means of the signals or measurement data of the optical sensor unit 26a and the ultrasonic sensor unit 26b of the sensor device 26 and, where applicable, further sensor units of the sensor device 26 there is checked the authenticity of the bank notes.

The control and evaluation device 30 has for this purpose in particular, in addition to corresponding interfaces for the sensor unit 26, a processor 32 and a memory 34 connected with the processor 32, in which at least one computer program 36 with program code is stored upon whose execution the processor 32 evaluates sensor signals or measurement data, in particular for the determination of a class of a bank note to be classified, and accordingly drives the apparatus 10 and the components thereof.

Preferably, the control and evaluation device 30, more precisely the processor 32 therein, is configured to check, after the quantitative ascertainment of at least one property of a bank note 12 to be classified, in which class of a plurality of different classes the bank note 12 to be classified falls, by for example checking whether the quantitatively ascertained property falls within the tolerance range of a classification parameter of a class, which is part of a set of classification parameters. If in this case a quantitatively ascertained property of a bank note to be classified falls within the tolerance range of a classification parameter, the control and evaluation device 30 thus assigns the bank note to the class which is defined by this classification parameter. The control and evaluation device 30, in particular the processor 32 therein, drives, in dependence on the ascertained class, the transport system 18, the gate device 20, and the gate devices connected upstream of the output pockets 22a-c such that the checked bank note is transported according to its ascertained class in one of the output pockets 22a-c for deposit or in the reject pocket 24 for a new manual check or for sorting out.

Preferably, the control and evaluation unit 30 of the bank note processing apparatus 10 is configured to carry out the method, which is described in the following and illustrated with reference to a flowchart in FIG. 2, for the determination of classification parameters or adaptation parameters as well as for the classification of bank notes. This method, which consists of an adaptation or a classification, or parts thereof are carried out preferably by means of the computer program 36, which is stored in the memory 34 of the control and evaluation unit 30 and accesses the processor 32 thereof. Alternatively, the method represented in FIG. 2 or parts thereof can be carried out on an external computer 38 connected with the control and evaluation unit 30, which computer can in turn be connected with a database 40 for the storage of large amounts of data.

Figure 2:
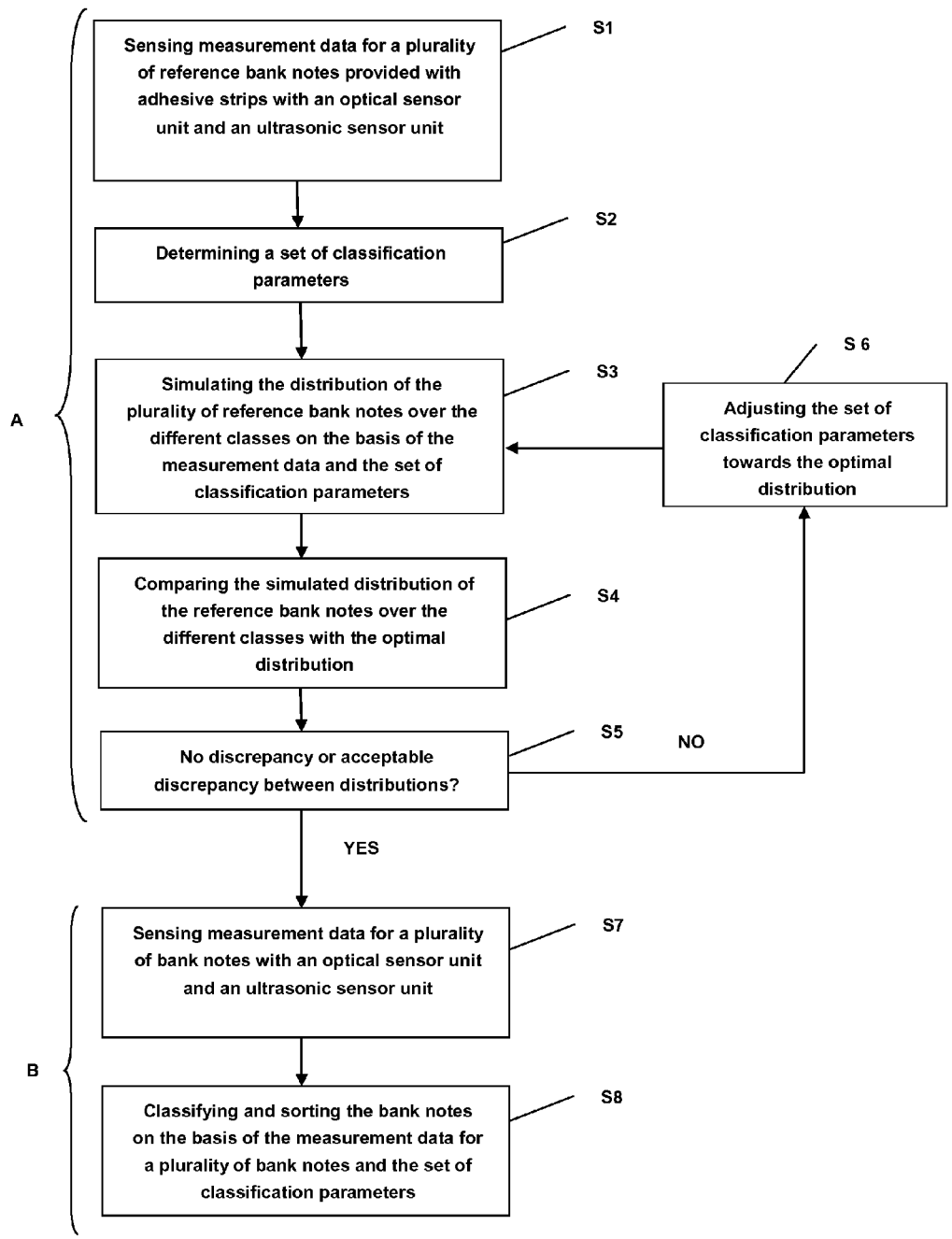
FIG. 2 a flowchart which illustrates the steps of a method for adapting and for classifying bank notes according to a preferred embodiment of the invention, FIG. 3 a schematic representation of an exemplary reference bank note of a plurality of reference bank notes for carrying out an adaptation with the bank note processing apparatus of FIG. 1, and FIG. 4 the signal value measured by means of an ultrasonic sensor unit for the determination of the thickness of the reference bank note of FIG. 3 as a function of the position along the reference bank note.

In a first step S1 of the method according to the invention illustrated in FIG. 2 for the determination of classification parameters and for the classification of bank notes, a plurality of reference bank notes are processed by means of the bank note processing apparatus 10 and in so doing measurement data are captured by the sensor device 26 and transmitted to the control and evaluation unit 30 by means of corresponding sensor signals. In so doing, a digital optical image of a bank note is captured by the optical sensor unit 26a of the sensor device 26 and the course of the local thickness of the bank note as a function of the position on the bank note is captured in the form of an "ultrasonic image" by the ultrasonic sensor unit 26b. For this purpose, at least some of the reference bank notes are preferably provided with an adhesive strip.

After a first set of classification parameters having been determined in step S2 of FIG. 2, which can be for example a first approximation of an optimal set of classification parameters which was determined upon a preceding adaptation of the apparatus 10, in step S3 of FIG. 2 there is ascertained how the reference bank notes are distributed, due to their measurement data determined in step S1, over the classes defined by the first set of classification parameters. The ascertainment of the distribution can be performed here for example by the control and evaluation device 30 or the external computer 38.

Since the reference bank notes are chosen such that their properties are known, it is also known to which class a respective reference bank note belongs or is to belong. This known association of the reference bank notes to the different classes defines the optimal distribution of the reference bank notes over the different classes. Normally, the distribution of the reference bank notes over the classes defined by the first set of classification parameters, which will subsequently also be referred to as simulated distribution of the reference bank notes, which distribution is ascertained in step S3 of FIG. 2 by means of the measurement data, deviates from the optimal distribution of the reference bank notes over the different classes. Whether this is the case will be checked in step S4 of FIG. 2.

Preferably, the simulated distribution is compared with the optimal distribution of the reference bank notes over the different classes in step S4 of FIG. 2, by a distance measure between the simulated distribution and the optimal distribution of the reference bank notes over the different classes being defined. For example, a simple distance measure can be defined in that a certain property being viewed which enters into the distribution of the reference bank notes (e.g. "fit"/"unfit") and it being counted how often the simulated distribution differs from the optimal distribution with regard to this property. But also more complex distance measures are conceivable. In the preferred case, in which the bank note processing apparatus 10 comprises, in addition to the optical sensor unit 26a, an ultrasonic sensor unit 26b, there can be employed for example the following distance measures:

$$D = \Sigma |F_{absolute} - F_{measured}| \text{ or}$$

$$D = \Sigma (F_{absolute} - F_{measured})^2$$

wherein D stands for the "distance", $F_{absolute}$ for the actual area of an adhesive strip and $F_{measured}$ for the measured area of the adhesive strip on a reference bank note and the sum is calculated over all the reference bank notes. According to the invention, a plurality of further distance measures is of course conceivable, into which further measured and actual properties of the reference bank notes may enter.

After preferably a distance measure having been calculated as described above for the comparison of the simulated and the actual distribution of the reference bank notes over the different classes in step S4 of FIG. 2, in step S5 of FIG. 2 there can be determined whether the distance calculated for a given distance measure is smaller than a defined threshold value.

If in step S5 of FIG. 2 it is determined that the distance calculated for a given distance measure is greater than a threshold value and there thus exists an unacceptable discrepancy between the simulated and the actual distribution of the reference bank notes over the different classes, in step S6 of FIG. 2 the set of classification parameters is adjusted or changed in such a way that this discrepancy is reduced. The person skilled in the art will recognize, that this is an optimization problem, in which the distance between the simulated and the actual distribution of the reference bank notes over the different classes, which distance is defined by a suitable distance measure, must be optimized, i.e. minimized, as a function of the classification parameters. Preferably, for this purpose there is employed an optimization method for the nonlinear optimization, such as for example a downhill simplex method with or without step size control, a simulated annealing method, or the like. The use of an evolutionary algorithm for the optimization is also possible. Here, the "genotype" of the individuals consists of the classification parameters, the individuals being subjected to recombination (replacement of parts of the "genotype"), mutation (small changes), and selection (assessment of quality, distance measure).

Due to the size of the parameter space defined by the classification parameters, for acceleration the above-described optimization problem can be divided into partial problems. For example, in the case of the ultrasonic sensor 26b the classification parameters for recognizing tears and/or holes are largely independent of the classification parameters for the finding of adhesive strips. The respective groups of classification parameters can thus be optimized preferably separately from each other.

According to a further preferred embodiment it is provided that expert knowledge obtained in former adaptations enters into the optimization or minimization of the distance, which is defined by a suitable distance measure, between the simulated and the actual distribution of the reference bank notes over the different classes as a function of the classification parameters. This expert knowledge is deposited and maintained preferably as a knowledge data base in the form of decision rules for example in the control and evaluation device 30 or the external computer 38 or the data base 40 connected therewith. This knowledge data base makes it possible that in step S6 of FIG. 2 a preselection from the various conceivable changes of the classification parameters is made even before the simulated distribution of the reference bank notes over the different classes is created anew in step S3 of FIG. 2 and thus to accelerate the optimization method.

If in step S5 of FIG. 2 no or merely an acceptable discrepancy between the simulated and the actual distribution of the reference bank notes over the different classes is ascertained, for example as described hereinabove, by means of a suitable distance measure, the set of classification parameters employed in step S3 of FIG. 2 for the creation of the simulated distribution of the reference bank notes over the different classes and, where applicable, adjusted earlier in step S6 of Figure is suitable for being used for the classification of bank notes to be processed with the bank note processing apparatus 10, which is effected in the steps S7 and S8 of FIG. 2. For this purpose, in step S7 of FIG. 2 the measurement data of a plurality of bank notes to be classified are sensed with the optical sensor unit 26a and the ultrasonic sensor unit 26b. On the basis of these respective measurement data, in step S8 of FIG. 2 a respective bank note to be classified is assigned to respectively one class defined by the optimized set of classification parameters and fed according to this assignment to one of the output pockets 22a-c or the reject pocket 24 of the bank note processing apparatus 10. As described hereinabove, this assignment is performed preferably by the control and evaluation device 30 of the bank note processing apparatus 10. As the person skilled in the art will recognize, the steps S1 to S6 represented in FIG. 2 form a method for the determination of an optimized set of classification or adaptation parameters (in FIG. 2 marked as part "A") which is carried out within the framework of a separate adaptation process, and the steps S7 and S8 represented in FIG. 2 a method for the classification of bank notes by means of this optimized set of classification or adaptation parameters (in FIG. 2 marked as part "B") which is carried out in the operation "proper" of the bank note processing apparatus 10.

Figure 3:
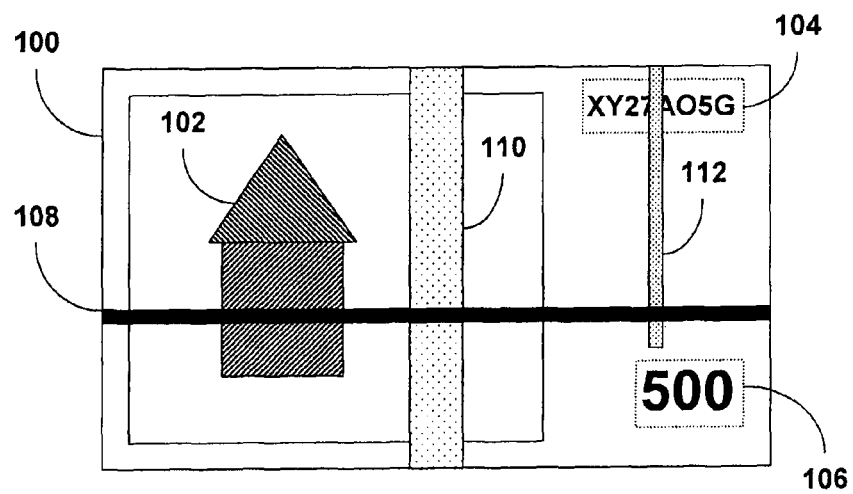

FIG. 3 shows a schematic representation of an exemplary reference bank note 100 of a set of reference bank notes which can be employed for carrying out the method for the determination of an optimized set of classification parameters described hereinbefore in connection with FIG. 2. On the exemplary reference bank note 100 there are printed by way of example a motif 102, a serial number 104, and the denomination 106 of the reference bank note 100, which can be captured well with the optical sensor unit 26. On the reference bank note 100 there are further located a first adhesive strip 110 and a second adhesive strip 112.

Figure 4:
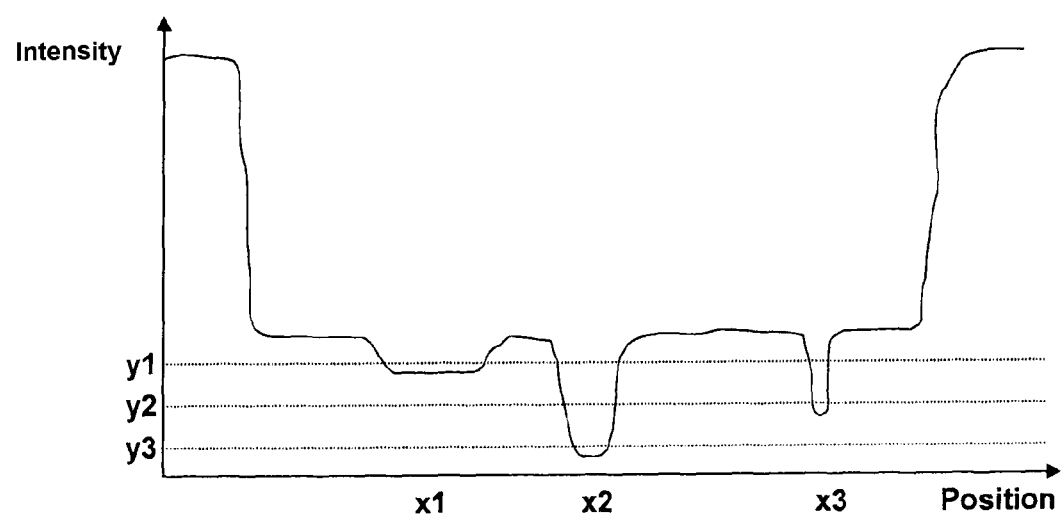

Due to the relative motion between the reference bank note 100 and the ultrasonic sensor unit 26b, the measuring dot defined by an element of the sensor line of the ultrasonic sensor unit 26b moves parallel to the moving direction of the reference bank note 100 along the reference bank note 100 and thereby defines an exemplary measuring track 108. The signal value or intensity course measured along this exemplary measuring track 108 by means of an element of the sensor line of the ultrasonic sensor unit 26b is schematically represented in FIG. 4. The person skilled in the art will recognize, that the whole sensor line of the ultrasonic sensor unit 26b delivers a plurality of such intensity courses which can be assembled into an "ultrasonic image" of the bank note 100, which delivers information about the local thickness of the bank note 100 as a function of the position on the bank note 100.

As this can be inferred from FIG. 3, in the exemplary reference bank note 100 the exemplary measuring track 108 captures in particular the motif 102, the first adhesive strip 110, and the second adhesive strip 112. These features are reflected in corresponding features in the intensity course represented in FIG. 4, namely in intensity minima pronounced to different extent at the positions x1, x2 and x3.

In FIG. 4 there are further drawn three different intensity threshold values y1, y2 and y3. It is conceivable that these three different intensity threshold values y1, y2 and y3 are used as classification parameters in the method for determining a set of classification parameters, described hereinabove in connection with FIG. 2, or at least enter into such a classification parameter. For example, the three different intensity threshold values y1, y2 and y3 could serve for determining whether or not a bank note has an adhesive strip, and/or for determining the size or area of an adhesive strip on a bank note. The person skilled in the art will recognize, that with the exemplary intensity course represented in FIG. 4 the control and evaluation device 30 would come to the conclusion, depending on the choice of the intensity threshold value or classification parameter (y1, y2 or y3), that the reference bank note 100 has three, two or only one adhesive strip. Likewise, the control and evaluation device 30 would come, depending on the choice of the intensity threshold value or classification parameter (y1, y2 or y3), to different results with respect to the size or area of the adhesive strips present on the reference bank note 100.

In practice it has turned out that the automated optimizing of classification parameters relating to the measurement data of the ultrasonic sensor unit 26b is difficult, namely in particular in the case of classification parameters which relate to the finding of adhesive strips on the reference bank notes and/or the determining of properties of adhesive strips on the reference bank notes, such as e.g. the area which the adhesive strip occupies on the reference bank note. For this reason, a preferred embodiment of the present invention is based on the further thought of configuring the reference bank notes employed in the method for the determination of classification parameters in such a way that these contain additional information items for the determination of a classification parameter relating to the measurement data of the ultrasonic sensor unit 26b, which information items can be ascertained by means of the optical sensor unit 26a and can be employed for the determination of a classification parameter relating to the measurement data of the ultrasonic sensor unit 26b.

According to a preferred embodiment, this additional information for the determination of a classification parameter relating to the measurement data of the ultrasonic sensor unit 26b can be contained in the reference bank notes by the usually transparent adhesive strips being colored, namely preferably with a color which stands out against the one or more colors which the background of the reference bank note has in the surrounding of the colored adhesive strip. In this configuration of the reference bank notes, for example the area, which a respective adhesive strip occupies on a reference bank note, can be readily determined by the control and evaluation device 30 on the basis of the measurement data captured by means of the optical sensor unit 26a. A corresponding classification parameter will then be chosen such that the areas of the adhesive strips determined by means of the measurement data of the optical sensor unit 26a match the areas of the adhesive strips determined by means of the measurement data of the ultrasonic sensor unit 26b as well as possible. In the example of FIG. 4, for example the areas of the adhesive strips determined by means of the measurement data of the optical sensor unit 26a could be employed for selecting the intensity threshold value such that on the basis of the measurement data of the ultrasonic sensor unit 26b there are determined corresponding areas for the adhesive strip at the position x2 or the adhesive strip at the position x3.

Additionally or alternatively, it is conceivable that the reference bank notes are configured such that the additional information items for the determination of a classification parameter relating to the measurement data of the ultrasonic sensor unit 26b are contained in the reference bank notes in a different manner, so that these can be ascertained by means of the optical sensor unit 26a and can be employed for the determination of a classification parameter relating to the measurement data of the ultrasonic sensor unit 26b. For example, the adhesive strips on the reference bank notes can again be configured colored, the adhesive strips occupying different areas on the reference bank notes and having different colors, as this is indicated in FIG. 3 by the different patterns of the adhesive strips 110 and 112, so that between the area and the color of an adhesive strip there exists a unique assignment. In this preferred configuration for example in the control and evaluation device 30 there can be deposited information items about which color corresponds to which area of an adhesive strip. For example, in the control and evaluation device there could be deposited that a blue adhesive strip has an area of 10% of the area of the reference bank note, a red adhesive strip an area of 5% of the area of the reference bank note, and a green adhesive strip an area of 2% of the area of the reference bank note. As a result, the control and evaluation device 30 after having determined the color of an adhesive strip knows the area thereof and can chose on the basis of these information items, as described hereinabove, a corresponding classification parameter such that the areas of the adhesive strips determined by means of the measurement data of the optical sensor unit 26a match the areas of the adhesive strips determined by means of the measurement data of the ultrasonic sensor unit 26b as well as possible.

Instead of coding the additional information items for the determination of a classification parameter relating to the measurement data of the ultrasonic sensor unit 26b into the respective color of an adhesive strip, so that these can be ascertained by means of the optical sensor unit 26a and can be employed for the determination of a classification parameter relating to the measurement data of the ultrasonic sensor unit 26b, according to preferred embodiments of the invention it is additionally or alternatively conceivable that these information items are present in the form of a numeric string (e.g. the serial number 104 represented in FIG. 3), a denomination (e.g. the denomination 106 represented in FIG. 3), a graphical motif (e.g. the motif 102 represented in FIG. 3), a barcode, or the like and can be extracted from the measurement data of the optical sensor unit 26a. Preferably, it is further provided that the additional information items for the determination of a classification parameter relating to the measurement data of the ultrasonic sensor unit 26b, which are deposited on the reference bank notes such that these can be ascertained by means of the optical sensor unit 26a and can be employed for the determination of a classification parameter relating to the measurement data of the ultrasonic sensor unit, contain, instead of the area information-items or additional to these, further information items about an adhesive strip, such as for example the position, thickness, extension and/or form of an adhesive strip on a reference bank note.

As this was already described hereinbefore and as this can also be inferred from FIG. 1, the control and evaluation unit 30 of the bank note processing apparatus 10 is connected preferably with an external computer 38 having a display unit in the form of a screen. On the external computer 38 there is preferably implemented a graphical user interface, by means of which a user can carry out and, where applicable, intervene in for example the method for the determination of a set of classification parameters described hereinabove. For example it is conceivable that the graphical user interface is configured such that a user can readjust classification parameters by means of the graphical user interface. The external computer 38 can further be connected with an external database 40 for storing large amounts of data, in particular image data. In other embodiments it is also conceivable that the external computer 38 and/or the external database 40 are part of the control and evaluation device 30.

The invention claimed is:

1. A method for the determination of a set of classification parameters for the classification of bank notes in different classes by means of a bank note processing apparatus, wherein the method comprises the following steps:

sensing measurement data for a plurality of reference bank notes having known properties by means of a sensor device of the bank note processing apparatus, at least some of the reference bank notes being provided with at least one adhesive strip, wherein the at least one adhesive strip has a color different from at least one color of a background of one of the plurality of reference bank notes in the surrounding of the at least one adhesive strip, such that a color of the at least one adhesive strip corresponds to a known adhesive strip size;

determining a set of classification parameters;

ascertaining the distribution of the plurality of reference bank notes over the different classes on the basis of the measurement data of the reference bank notes and the set of classification parameters;

comparing the distribution over the different classes, which was determined for the plurality of reference bank notes, with the optimal distribution of the reference bank notes over the different classes, which was ascertained from the known properties of the plurality of reference bank notes; and if the two distributions deviate from each other, adjusting the set of classification parameters until the distribution of the plurality of reference bank notes over the different classes, which was determined on the basis of the measurement data of the reference bank notes and the changed set of classification parameters, and the optimal distribution of the reference bank notes over the different classes, which was ascertained from the known properties of the plurality of reference bank notes, no longer deviate from each other or the deviation between these distributions is acceptable.

2. The method according to claim 1, wherein for the determination of the deviation between the distribution of the plurality of reference bank notes over the different classes, which was determined on the basis of the measurement data of the reference bank notes and the set of classification parameters, and the optimal distribution of the reference bank notes over the different classes, which was ascertained from the known properties of the plurality of reference bank notes, there is employed a distance measure which must be minimized.

3. The method according to claim 1, wherein the measurement data sensed for a plurality of reference bank notes by the sensor device of the bank note processing apparatus comprise both optical measurement data, in particular image data, of the reference bank notes, which were sensed by means of an optical sensor unit of the sensor device, and measurement data sensed by means of an ultrasonic sensor unit of the sensor device.

4. The method according to claim 1, wherein the reference bank notes provided with an adhesive strip are configured such that these reference bank notes contain additional information items for the determination of a classification parameter relating to the measurement data of an ultrasonic sensor unit, which information items can be ascertained by means of the optical sensor unit and can be employed for the determination of the classification parameter relating to the measurement data of the ultrasonic sensor unit.

5. The method according to claim 4, wherein the adhesive strips on the reference bank notes are configured occupying different areas on the reference bank notes and having different colors, so that between the area and the color of an adhesive strip there exists a unique assignment which is employed for deriving the area of an adhesive strip due to its color.

6. The method according to claim 4, wherein the reference bank notes with an adhesive strip have the additional information items for the determination of a classification parameter relating to the measurement data of the ultrasonic sensor unit, which information items can be ascertained by means of the optical sensor unit and can be employed for the determination of the classification parameter relating to the measurement data of the ultrasonic sensor unit, in the form of a numeric string, a denomination, a graphical motif, a barcode, or the like.

7. The method according to claim 4, wherein the additional information items for the determination of a classification parameter relating to the measurement data of the ultrasonic sensor unit, which are deposited on the reference bank notes such that these can be ascertained by means of the optical sensor unit and can be employed for the determination of the classification parameter relating to the measurement data of the ultrasonic sensor unit, contain information items about the area, the position, the thickness, the extension, the form of an adhesive strip and/or the number of adhesive strips on a reference bank note.

8. A method for classifying bank notes, wherein the method comprises the following steps:

determining at least one quantitative property of a bank note to be classified; and classifying the bank note to be classified on the basis of the quantitative property of the bank note to be classified and of classification parameters, the classification parameters having been determined with the method according to claim 1.

9. An apparatus for processing value documents, in particular bank notes, wherein the apparatus comprises:

a sensor device for generating measurement data for a plurality of reference bank notes having known properties, at least some of the reference bank notes being provided with at least one adhesive strip, wherein the at least one adhesive strip has a color different from at least one color of a background of one of the plurality of reference bank notes in the surrounding of the at least one adhesive strip, such that a color of the at least one adhesive strip corresponds to a known adhesive strip size;

a control and evaluation device, wherein the control and evaluation device is configured to carry out the following steps:

determining a set of classification parameters;

ascertaining the distribution of the plurality of reference bank notes over the different classes on the basis of the measurement data of the reference bank notes and the set of classification parameters;

comparing the distribution over the different classes, which was determined for the plurality of reference bank notes, with the optimal distribution of the reference bank notes over the different classes, which was ascertained from the known properties of the plurality of reference bank notes; and if the two distributions deviate from each other, adjusting the set of classification parameters until the distribution of the plurality of reference bank notes over the different classes, which was determined on the basis of the measurement data of the reference bank notes and the changed set of classification parameters, and the optimal distribution of the reference bank notes over the different classes, which was ascertained from the known properties of the plurality of reference bank notes, no longer deviate from each other or the deviation between these distributions is acceptable.

* * * * *